United States Patent [19]

Isenberg et al.

[11] 4,057,369
[45] Nov. 8, 1977

[54] VACUUM PUMP HAVING A ROTOR SUPPORTED IN THE INTERIOR OF ITS CASING

[75] Inventors: Gerhard Isenberg, Dachau; Wolfgang Tuzinsky, Munich, both of Germany

[73] Assignee: Maschinenfabrik Augsburg-Nurnberg AG, Munich, Germany

[21] Appl. No.: 490,849

[22] Filed: July 22, 1974

[30] Foreign Application Priority Data

July 21, 1973 Germany .............................. 2337226

[51] Int. Cl.² ............................................. F04B 17/00
[52] U.S. Cl. ...................................... 417/365; 308/10; 415/90; 415/101; 415/107; 417/423 R
[58] Field of Search ......................... 415/90, 101, 107; 417/423 R, 365, 420; 308/10; 310/62, 63; 74/5.46

[56] References Cited

U.S. PATENT DOCUMENTS

| 2,700,343 | 1/1955 | Pezzillo | 417/365 X |
|---|---|---|---|
| 2,856,239 | 10/1958 | Dacus | 308/10 |
| 3,066,849 | 12/1962 | Beams | 308/10 X |
| 3,146,038 | 8/1964 | Lautzenhiser | 308/10 |
| 3,155,437 | 11/1964 | Kinsey et al. | 308/10 |
| 3,184,271 | 5/1965 | Gilinson | 308/10 |
| 3,199,932 | 8/1965 | Clark | 308/10 |
| 3,536,418 | 10/1970 | Breaux | 415/90 |
| 3,668,393 | 6/1972 | VonRauch | 415/90 |
| 3,678,765 | 7/1972 | Feldman | 74/5.46 |
| 3,759,626 | 9/1973 | Becker | 415/90 |
| 3,771,909 | 11/1973 | Rousseau et al. | 415/90 X |
| 3,778,122 | 12/1973 | Doll et al. | 308/10 |
| 3,823,990 | 7/1974 | Gilinson | 308/10 |

FOREIGN PATENT DOCUMENTS

| 674,067 | 11/1963 | Canada | 308/10 |
|---|---|---|---|
| 1,015,887 | 1/1966 | United Kingdom | 415/90 |

*Primary Examiner*—William L. Freeh
*Assistant Examiner*—Edward Look
*Attorney, Agent, or Firm*—Craig & Antonelli

[57] ABSTRACT

The present invention relates to magnetic support of the rotor structure in vacuum pumps, particularly turbomolecular pumps. This magnetic support eliminates the requirements for bearing lubricants, and the consequent degradation of the vacuum to be produced by lubricant vapors.

15 Claims, 2 Drawing Figures

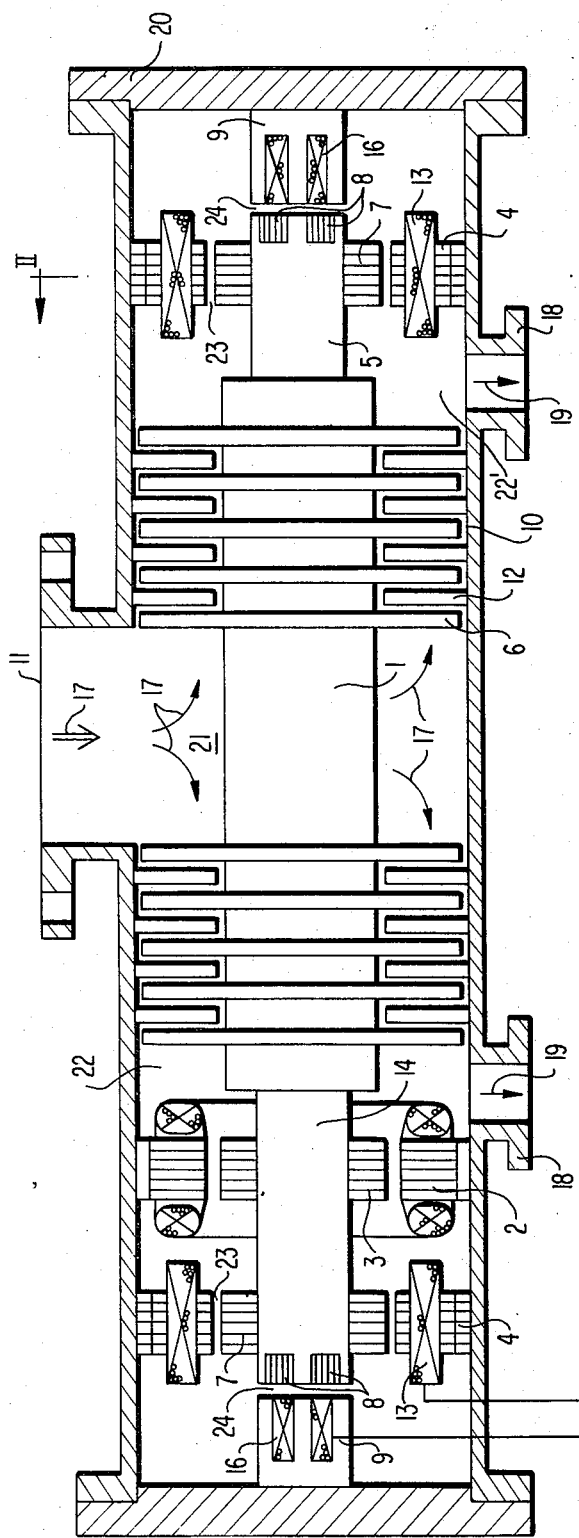
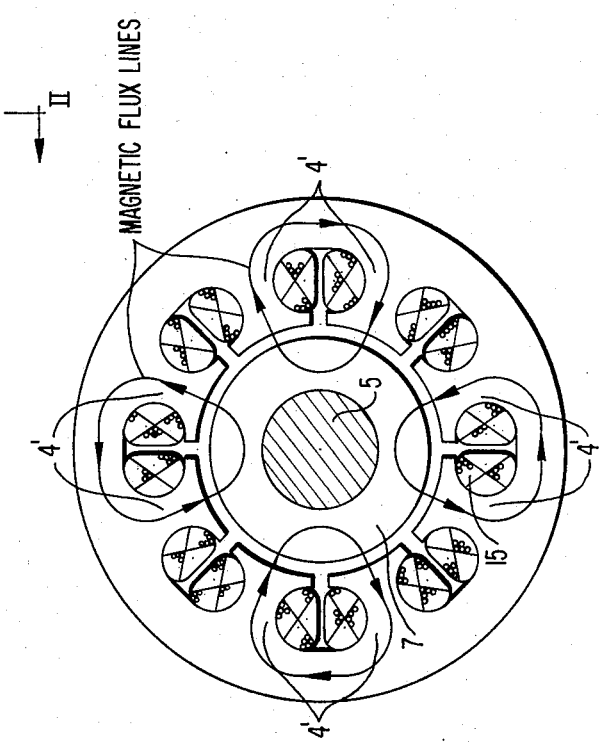
FIG. 1
FIG. 2

VACUUM PUMP HAVING A ROTOR SUPPORTED IN THE INTERIOR OF ITS CASING

The present invention relates to a vacuum pump having a rotor supported in the interior of its casing, more particularly to a turbomolecular pump of this category, for generating a vacuum free from bearing lubricant, more particularly from bearing oil.

While a lubricant-free vacuum is often desirable, it has been impossible to achieve in conventional vacuum pumps owing to the lubricant vapors emanating from the rotor bearings. This occurs particularly in the case of turbomolecular pumps, which are normally built on the multi-stage axial-flow compressor principle for $10^{-2}$ to $10^{-11}$ Torr duty at rotor speeds of 30,000 rpm and over. The bearings of such of the often of the precision antifriction type, rely on circulating lubricant, more particularly oil, for lubrication and cooling. This causes lubricant or oil vapors to occur, especially with the rotor at rest, at the bearing or one bearing side of the pump (which would be a partial vacuum side of the pump) and flow to the high-vacuum side of the pump and into the chamber or vessel to be evacuated where they precipitate on the walls.

In applications calling for a vacuum low in lubricant or hydrocarbons (normally the lubricating oil essentially consists of hydrocarbons), this condition necessitates lengthy and thus costly heating operations when restarting the pump. Hydrocarbon molecules in the vacuum will reduce the resistance to arcing. Heating by the use of heating means placed around the vessel and the pump casing to evaporate lubricant or oil on the walls, and expelling the vapors together with the atmosphere or gas by the action of the pump, will just achieve a vacuum low in lubricant or lubricating oil, yet at a great deal of effort and expense.

In a broad aspect, the present invention provides a vacuum pump of the initially cited category for generating a vacuum free from bearing lubricant, more particularly from bearing oil.

It is a particular object of the present invention to provide a vacuum pump which uses magnetic means to support the rotor without mechanical contact. The absence of mechanical contact obviates the need for lubricant or oil to lubricant and/or cool the bearings, so that no such vapors will occur. Consequently, the vacuum to be generated will be free from such vapors and, thus, free from bearing lubricant. This will likewise eliminate the need for heating and the apparatus required therefor.

A further advantage is seen to lie in that the properties of the bearing will not have to suit the properties of the medium to be pumped. In the absence of mechanical contact, no provision must be made for special materials for the running surface of the bearings. Consequently, such materials can by virtue of their absence be free from corrosion when communication exists between the bladed or otherwise fitted pumping chamber and the bearing space. The present invention, therefore, qualifies such a pump for pumping corrosive, radioactive or similar media. The medium to be pumped is free from contacting or mixing with a bearing lubricant; and this in turn eliminates the risk of one of these media contaminating the other, of mutual contamination and chemical reaction, of radioactive contamination and of decomposition of a bearing lubricant as a result of radioactive contamination.

FIG. 1 illustrates an embodiment of a turbomolecular pump assembled in accordance with the present invention and here presenting a double-flow axial-flow pump.

FIG. 2 of the drawings illustrates an alternative embodiment to that shown in FIG. 1 of the magnetic means for radially supporting the pump rotor in the absence of mechanical contact and is a section taken through II — II of FIG. 1.

Arranged in a pump casing 10 of horizontal extent is a horizontally extending rotor consisting of (apart from the parts entering in the electromagnetic means which will be considered later) a rotor hub 1, bladed rotor vanes 6 (the casing 10 carries the associated stator vanes 12) and two shaft journals 5 and 14. The rotor is driven by an electric motor comprising a stator 2 and a rotor 3, the latter being fixedly attached to the pump rotor.

Centrally, in the horizontal axial direction, the casing 10 exhibits an intake pipe 11, and the gas to be pumped flows (see arrowheads 17) from the high-vacuum side of the pump in the central area of the pump, or from the high-vacuum chamber 21 in this location, in both horizontal axial directions through the blade cascades of the vanes 6 and 12 to the two partial vacuum sides of the pump, or the outlet chambers 22 and 22' of the pump. The pumped medium exits from the outlet chambers 22 and 22' through exhaust pipes 18 in the direction of arrowheads 19.

Arranged on these partial vacuum sides, or in the general area of each of the two axial ends of the casing 10 and of the rotor, is a radial rotor bearing and an axial rotor bearing. The electric motor 2, 3 is arranged between the outlet vane of one pump passage and the radial bearing at this side. The casing 10 is closed at its horizontal axial ends by means of a cover 20 to thereby seal the pump except for the inlet (intake pipe 11) and the outlet (exhaust pipes 18). Rotor shaft lead-ins in the casing for connection with outboard bearings, and the sealing problems associated therewith in conventional devices are here eliminated.

The rotor is supported in said four bearings exclusively by magnetic means: the shaft journal 5 and 14 are each surrounded by a set of at least three, more particularly four, electromagnets which are equally spaced over the entire circumference of 360° and which are fixedly arranged on the casing 10. Each electromagnet consists of a U-shaped laminated core 4, the U-legs of which follow one upon the other circumferentially, and of a winding 13 around the laminated core 4. Seated on each shaft journal 5 and 14 is an annular, coaxially laminated core 7 for magnetic reaction with the electromagnets 4, 13. The electromagnets 4, 13 and the laminated cores 7 form magnetic means for radially supporting the rotor free of mechanical contact.

Fixedly arranged on the end face of each shaft journal 5 and 14 is a laminated core 8 for magnetic reaction with an electromagnet which is a cup magnet or face magnet, and consists of a laminated core 9 and a winding 16. This electromagnet is attached inside the casing 10 to a cover 20 of the casing 10. The electromagnets 9, 16 and these laminated cores 8 form magnetic means for axially supporting the rotor without mechanical contact.

The width of the radial gap 23 and the axial gap 24 may be determined to suit the design requirements and may be in the order of magnitude of about 1 mm. On either horizontally axial side of the pump, the radial gap 23 and the axial gap 24, as do generally the interior spaces of the pump around the shaft journal 14 or 5 and said parts of said magnetic means, communicate with the outlet chamber 22 or 22'. This is not objectionable since the rotor bearings are not in need of lubrication.

Bearing support without mechanical contact is achieved in that each said winding 13 or 16 is electrically energized separately. The flow of electrical current, with consideration given the rotor weight and allowance made or anticipated for axial thrust impressed on the rotor by the flow through it, produce electromagnetic fields of attraction permeating the respective electromagnet and associated laminated core. The resulting magnetic forces of attraction maintain the rotor in its intended position. The intensity of current through each winding, and thus the force of attraction of each said magnetic means can be varied or controlled; and the magnetic support of the rotor is active in nature. In the case of this double-flow axial-flow pump the axial thrust imparted to the rotor by the flow through it is zero or relatively small, so that the electromagnetic means 9, 16, 8, unlike those of single-flow vacuum pumps, can safely be designed for light duty.

In a further aspect of the present invention, the rotor is maintained in its central position and/or any imbalance is corrected using non-contacting means for measuring the gaps, such as inductive or capacitive pickups or field sensors. In response to the measured widths of gap, an electronic control unit then adjusts said magnetic forces of attraction in the sense generally that the gaps are maintained at a consistent dimension.

As it will become apparent from FIG. 2 the electromagnets 4, 13 can be replaced by annular iron members having internally projecting teeth 4', and windings 15, where a winding 15 is provided on each tooth 4'. The magnetic fluxes, as is indicated by the arrowheads, pass through two circumferentially adjacent windings 15 at a time, or through the teeth 4' and the yokes of the annular member and the laminated core 7, and so alternately in a circumferential sense.

The laminated cores 8 and the electromagnets 9, 16 can also be eliminated and the two laminated cores 7 instead be provided in opposite arrangement with peripheries extending at an angle with the centerline of the rotor, and the laminated cores 4 or 4' with parallel associated inner ends.

Elimination of all bearing lubricant and coolant prevents vapors from such a medium from arising, with the rotor at rest, at the rotor bearings and from penetrating through said blade cascades into the high-vacuum chamber 21 or into the intake pipe 11 or into a chamber to be evacuated which communicates therewith but is not shown on the drawings.

While we have shown and described several embodiments in accordance with the present invention it is understood that the same is not limited thereto but is susceptible of numerous changes and modifications known to a person skilled in the art, and we therefore do not wish to be limited to the details shown and described herein but intend to cover all such changes and modifications as are obvious to one of ordinary skill in the art.

What is claimed is:

1. A vacuum pump for generating high vacuums free of lubricating vapors, said pump comprising:

a housing having a horizontal extent, said housing including a vacuum intake chamber and at least one outlet means, a rotor structure supported horizontally along the horizontal extent of said housing, said rotor structure including a shaft and a plurality of rotor vanes mounted on said shaft, said plurality of rotor vanes being in cooperation with a plurality of stator vanes mounted in said housing, and said plurality of rotor and stator vanes being arranged between said intake chamber and said outlet means, an electric motor means mounted in said housing for rotation said rotor structure, and electromagnetic support means for rotatably supporting said rotor structure in said housing, said electromagnetic support means supporting said rotor structure both axially and radially, wherein said electromagnetic support means includes a plurality of radially mounted magnetic cores on said shaft and a plurality of electromagnets mounted in said housing in operative relationship with said plurality of radial magnetic cores for providing radial support of said rotor structure, wherein said electromagnetic support means further includes at least one axial magnetic core mounted on the end face of said shaft and at least one electromagnet mounted in said housing in operative relationship to said axial magnetic core for providing axial support for said rotor structure, each of said electromagnets of said magnetic support means being electrically energized separately;

wherein said horizontally supported rotor structure includes two journal shafts extending from a central rotor hub, a portion of said plurality of rotor vanes being mounted on each of said two journal shafts and a portion of said stator vanes being mounted in said horizontally extending housing to be in cooperation with said rotor vanes on each journal shaft;

wherein said electric motor means includes a rotor means and a stator means, said rotor means being mounted on one of said two journal shafts, and said stator means being mounted in said housing in operative relationship to said rotor means; and wherein said plurality of radially mounted magnetic cores includes two annular, laminated magnetic cores, each of said annular cores being mounted on each of said two journal shafts, and said plurality of electromagnets is mounted in said housing in operative relationship to each of said annular magnetic cores, and wherein said at least one axial magnetic core is mounted within the end face of each journal shaft and said at least one electromagnet is mounted in said housing in operative relationship to said axial magnetic cores in each respective end face of said journal shafts.

2. A vacuum pump for generating high vacuums free of lubricating vapors, said pump comprising:

a housing having a horizontal extent, said housing including a vacuum intake chamber and at least one outlet means, a rotor structure supported horizontally along the horizontal extent of said housing, said rotor structure including a shaft and a plurality of rotor vanes mounted on said shaft, said plurality of rotor vanes being in cooperation with a plurality of stator vanes mounted in said housing, and said plurality of rotor and stator vanes being arranged between said intake chamber and said outlet means, an electric motor means mounted in said housing for rotating said rotor structure, and electromagnetic support means for rotatably supporting said rotor structure in said housing, said electromagnet support means supporting said rotor structure both axially and radially, wherein said electromagnetic support means includes a plurality of radially mounted magnetic cores on said shaft and a plurality of electromagnets mounted in said housing in operative relationship with said plurality of radial magnetic cores for providing radial support of said rotor structure, wherein said electromagnetic support means further includes at least one axial magnetic core mounted on the end face of said shaft and at least one electromagnet mounted in said housing in operative relationship to said axial magnetic core for providing axial support for said rotor structure, each of said electromagnets of said magnetic support means being electrically energized separately; and wherein said plurality of radially mounted magnetic cores includes a first plurality of laminated annular magnetic cores mounted on said shaft adjacent a first end face of said shaft and a second plurality of laminated annular magnetic cores mounted on said shaft adjacent a second end face of said shaft, and wherein said at least one axial magnetic core includes a first axial magnetic core mounted in said first end face and a second axial magnetic core mounted in said second end face.

3. A vacuum pump according to claim 2, wherein said vacuum intake chamber is arranged in said housing about a central portion of said rotor shaft, and two outlet means are provided in said housing, each of said two outlet means being arranged at portions of said horizontally extending housing downstream of said plurality of rotor and stator vanes from said intake means in the direction of gas flow.

4. A vacuum pump according to claim 2, wherein said electric motor means includes a rotor means mounted on said shaft and a stator means mounted in said housing in operative relationship to said rotor means.

5. A vacuum pump according to claim 2, wherein said outlet means is arranged in said housing downstream of said plurality of rotor and stator vanes from said intake chamber in the direction of gas flow.

6. A vacuum pump according to claim 2, wherein said plurality of electromagnets mounted in said housing in operative relationship with said first plurality of annular magnetic cores include at least four electromagnets corresponding to each of said annular magnetic cores and equally spaced circumferentially over 360°.

7. A vacuum pump according to claim 2, wherein said electric motor means is mounted on said shaft axially between said plurality of rotor and stator vanes and said electromagnetic support means.

8. A vacuum pump for generating high vacuums free of lubricating vapors, said pump comprising:

a housing, said housing including a vacuum intake chamber and at least one outlet means, a rotor structure supported in said housing, said rotor structure including a shaft and a plurality of rotor vanes mounted on said shaft, said plurality of rotor vanes being in cooperation with a plurality of stator vanes mounted in said housing, and said plurality of rotor and stator vanes being arranged between said intake chamber and said outlet means, an electric motor means mounted in said housing for rotating said rotor structure, and electromagnetic support means for rotatably supporting said rotor structure in said housing, said electromagnetic support means supporting said rotor structure both axially and radially, wherein said electromagnetic support means includes a first annular laminated magnetic core and a second annular laminated magnetic core mounted on said shaft, and a plurality of radial electromagnets mounted in said housing in operative relationship with each of said first and second annular laminated magnetic cores for providing contact-free radial support of said rotor structure within said housing, and wherein said electromagnetic support means further includes at least one axial magnetic core mounted in each end face of said shaft, and at least one axial electromagnet mounted in said housing in operative relationship to each of said axial magnetic cores at the ends of said shaft for providing contact-free axial support for said rotor structure within said housing.

9. A vacuum pump according to claim 8, further comprising means for electrically energizing said electromagnets of said support means, wherein each of said plurality of radial electromagnets and each of said axial electromagnets are separately energized electrically.

10. A vacuum pump according to claim 9, wherein said plurality of rotor vanes and stator vanes include a first plurality of rotor vanes and stator vanes mounted in said housing at an opposite side of said intake chamber from a second plurality of rotor vanes and stator vanes, such as to provide a double-flow, axial-flow pump.

11. A vacuum pump according to claim 9, wherein said means for electrically energizing said electromagnets further include means for selectively controlling the magnetic forces of said electromagnets such as to maintain a constant predetermined contact-free radial and axial separation dimension between said magnetic cores and said electromagnets.

12. A vacuum pump according to claim 8, wherein said plurality of radial electromagnets include at least four electromagnets circumferentially surrounding each of said annular magnetic cores, and being equally spaced over the entire circumference of 360° of said annular magnetic cores.

13. A vacuum pump according to claim 12, wherein each of said radial electromagnets include a U-shaped laminated core with the U-legs of each core following one another circumferentially, and a winding around each of said U-shaped laminated cores.

14. A vacuum pump according to claim 12, wherein each of said radial electromagnets include annular iron members having a plurality of teeth projecting toward said annular laminated magnetic cores on said shaft, and windings provided on each of said teeth.

15. A vacuum pump according to claim 8, wherein said housing has a horizontal axial extent, and said rotor shaft is supported axially along said horizontal extend of said housing.

* * * * *